Figure 4:
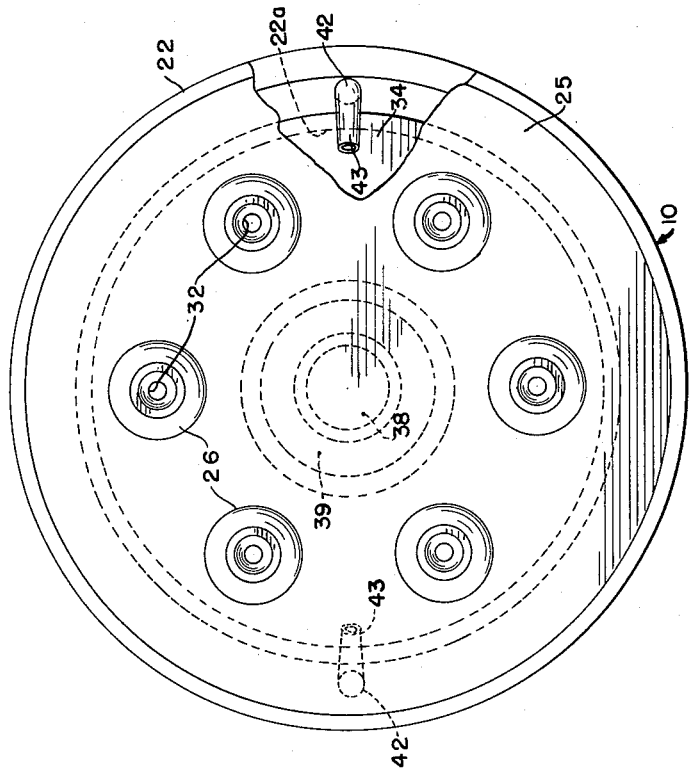

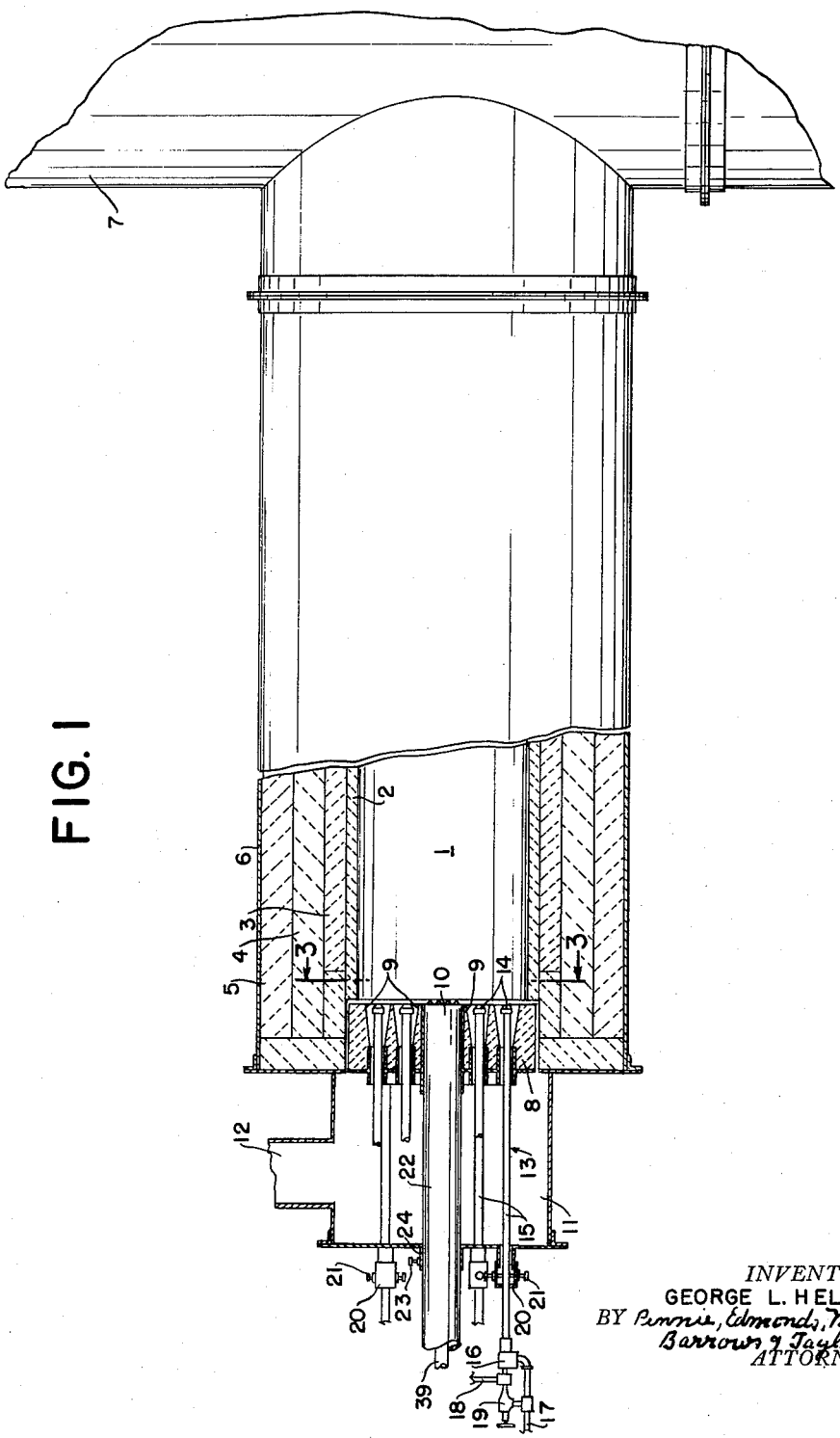

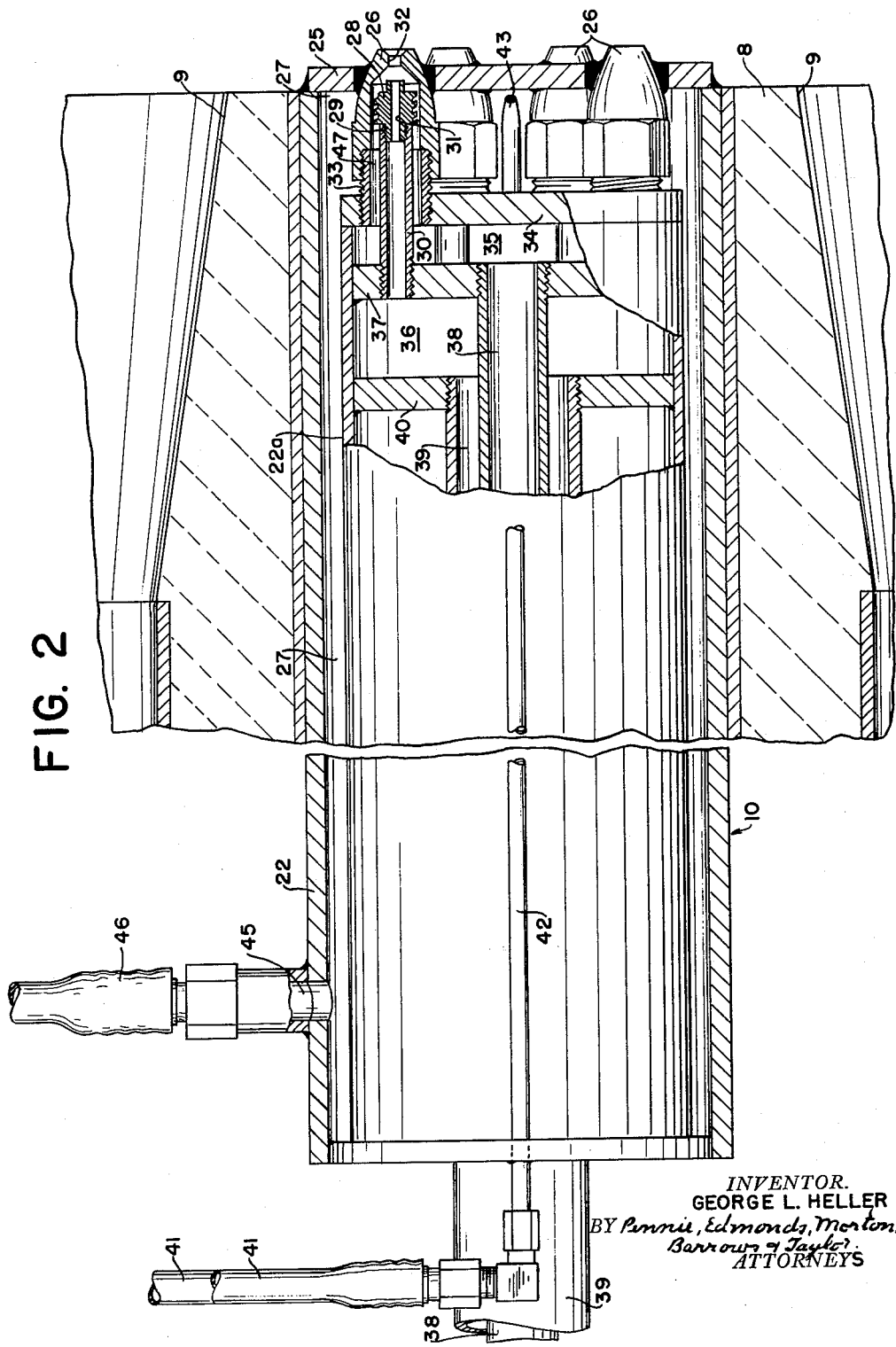

Oct. 10, 1961 G. L. HELLER 3,003,854
MANUFACTURE OF CARBON BLACK
Filed Dec. 23, 1957 3 Sheets-Sheet 3

INVENTOR.
GEORGE L. HELLER
BY Pennie, Edmonds, Morton,
Barrows & Taylor
ATTORNEYS 3,003,854
MANUFACTURE OF CARBON BLACK
George L. Heller, Monroe, La., assignor to Columbian Carbon Company, New York, N.Y., a corporation of Delaware
Filed Dec. 23, 1957, Ser. No. 704,710
11 Claims. (Cl. 23—209.4)

This invention relates to the manufacture of carbon black by the thermal decomposition of hydrocarbons or like materials and relates more particularly to improved method and means whereby carbon blacks having highly desirable characteristics may be economically produced in high yields and at high furnace loads by the decomposition of readily available normally liquid petroleum or coal tar distillates or residues, herein referred to collectively as make.

In United States Patent 2,499,438 there is described and claimed a process for producing carbon black whereby a combustible mixture of a fuel gas and an oxygen-containing gas is blasted longitudinally into one end of an elongated, unobstructed, heat-insulated chamber as a multiplicity of streams symmetrically positioned over the cross-sectional area of the chamber and is burned therein to form a turbulent stream of blast flame gases passing through the chamber at a temperature in excess of that at which hydrocarbons are decomposed to carbon black and the hydrocarbon to be decomposed is separately and forcefully injected into the resultant stream of blast flame gases in a direction concurrent with, and generally parallel to, the direction of flow of the blast flame gases through the chamber.

In the process specifically disclosed in the patent, the hydrocarbon make is injected into the furnace chamber as a plurality of streams uniformly positioned over the transverse section thereof and flanked on all sides by the entering streams of combustible mixture. The process of that patent has been extensively used in the production of carbon black, especially where gaseous fuel, i.e. natural gas, has been economically available.

Under present conditions, gaseous fuels, such as natural gas or liquid fuels readily convertible to vapors, are frequently not economically available or attractive in the manufacture of carbon black, and the use of liquid fuels for that purpose, often heavy petroleum residues, is becoming increasingly urgent. Also, it is now generally desirable to use, as the make, heavy distillate or residues which are not readily vaporized prior to injecting them into the furnace chamber.

The present invention provides an improved process, of the general type described in the previously noted patent, but which is especially adapted to the use of such liquid distillates or residues both as the fuel and as the make, and also provides apparatus especially adapted to the carrying of my process.

In operations such as those to which the present invention relates, it is desirable that combustion of the fuel blast be substantially complete prior to the mixing of the make with the resulting stream of hot blast flame gases. Various complex furnace designs have been proposed for accomplishing that purpose. A further major problem has been the avoidance of decomposing the make to carbon or coke while in the form of liquid droplets of appreciable size, i.e. before the make has been adequately vaporized or otherwise dispersed.

It has been found that the yield and characteristics of the ultimate carbon black are materially influenced by the rapidity with which the make, introduced as an atomized liquid spray, is mixed with the hot blast flame gases. If this mixing is too rapid and destructive decomposition precedes adequate dispersion of the make, the inadequately dispersed liquid particles are carbonized to form what are known as "coke balls."

Further, it is generally recognized that in the operation of conventional carbon black processes, the particle size of the carbon black is subject to considerable variation by increasing or decreasing the rate at which the make is charged to the furnace of a given size and structure. In other words, particle size has to a considerable extent been dependent upon furnace load. Usually the particle size is increased materially as the charge rate or load is increased. Further, in using liquid make, increase in charge rate has been found to increase the tendency toward the production of coke balls, resulting in a less desirable product.

Primary objects of the present invention are to provide a process, and apparatus of simple construction adapted to the carrying out of such process, whereby a carbon black of high quality, relatively high structure and intermediate fineness may be economically produced from liquid make in high yield and at high furnace load using a liquid fuel for generating the hot blast flame gas stream.

These objects and other advantages, as will hereinafter appear, are attained in accordance with my present invention.

By my improved process, I develop a turbulent stream of hot blast flame gases within an elongated, heat-insulated and unobstructed reaction chamber, similar to that disclosed in the aforesaid patent, by forcefully injecting longitudinally into the upstream end of the chamber a multiplicity of gas-atomized streams of the liquid fuel and a free oxygen-containing gas, e.g. air, symmetrically positioned over the cross-sectional area of the chamber. And I separately and forcefully inject the make, also substantially longitudinally, into the upstream end of the chamber as one or more symmetrically positioned gas-atomized liquid sprays. Where a single make spray is used, it is positioned coaxially with the chamber. Where a plurality of make sprays are used, they are symmetrically positioned about the longitudinal axis of the chamber, each spaced from the outer wall of the chamber a distance, depending upon the spread of the sprays, such that unvaporized make will not impinge on said wall.

Though a single, coaxially positioned make spray may be used with advantage, more advantageously I use a cluster of such make sprays grouped about the longitudinal axis of the chamber and in close proximity thereto, as I have found that this permits the introduction of a greater amount of make at equal atomization, thus materially increasing the permissible furnace load.

Where the liquid fuel or make is of a relatively high viscosity, it is desirable to preheat it prior to atomization. The fuel oil is with advantage preheated to 250°–600° F. depending upon the type of oil used. Likewise, the make is with advantage preheated to 50° to 500° F. Temperatures in the lower portion of these ranges suffice for distillates or low viscosity residues while the higher temperatures should be used for the high viscosity residues.

The gas used for atomizing the liquid fuel and the liquid make may be either air or steam or other available gas. Usually preheated air is more advantageous for atomizing the fuel, as it promotes more rapid combustion. For atomizing the make, preheated steam is preferred. For this purpose, steam preheated to 500° F., or thereabout, is advantageously used. These atomizing gases should be under substantial pressure, advantageously 30 pounds to 100 pounds per square inch, depending primarily upon the viscosity of the oil. The oil need be at only a moderate pressure of 3 to 4 pounds.

One outstanding advantage of my new process and apparatus is the wide range of make and fuel stocks which may be used, thus being adapted to use under a wide variety of economic and market conditions prevailing in various geographic areas. Generally, it is more advantageous to use, as the make, a highly aromatic petroleum residue such as produced by the thermal cracking of recycle stock from catalytic cracking operations. However, other residues or distillates of either high or low aromaticity may be used as the make. Likewise liquid fuel stocks of most any type may be used, though #2 or #6 fuel oil is usually more advantageous.

Figure 3:
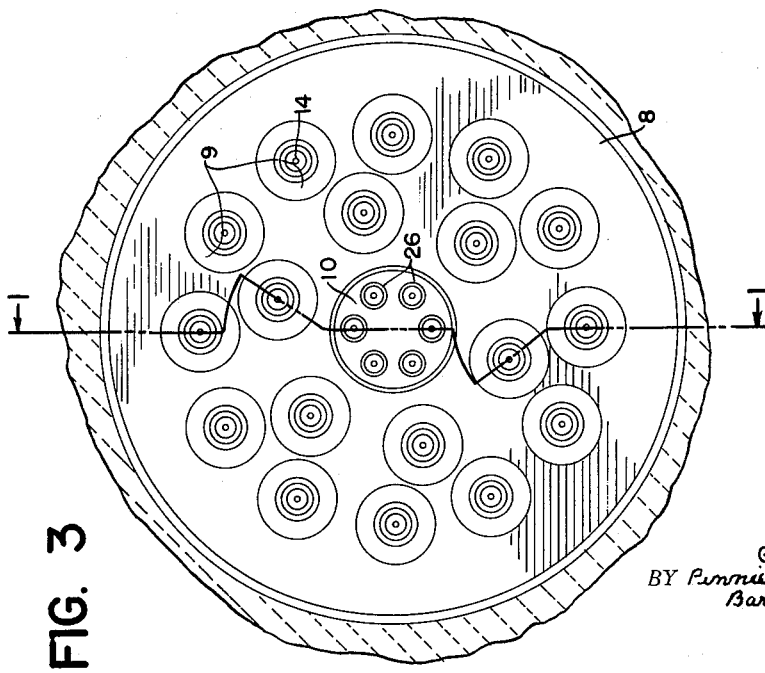

The invention will be further described and illustrated with reference to the accompanying drawings which represent my presently preferred embodiment of the invention in apparatus adapted to the carrying out of the process and of which:

FIG. 1 is a side elevational view of the furnace, partly in section along the line 1—1 of FIG. 3, FIG. 2 is an enlarged sectional view of the make injector assembly shown in FIG. 1, FIG. 3 is an enlarged end view of the burner block and make injector assembly along the line 3—3 of FIG. 1, and FIG. 4 is a further enlarged end elevational view of the make injector assembly.

Referring more particularly to FIG. 1, the apparatus illustrated comprises an elongated cylindrical reaction chamber 1 delineated by a side wall composed of a furnace refractory lining 2, backed by fire brick 3 and outer layers 4 and 5 of brick and heat-insulation, respectively, all encased in a sheet metal covering 6. At its right-hand end, the reaction chamber opens into a vertical cooler 7, of conventional structure, and from which the furnace effluent passes to a separating and collecting system of conventional type, which need not here be described.

The left-hand end, i.e. the upstream end of the furnace chamber, is closed by a ceramic burner block 8 provided with a multiplicity of burner ports 9 and a coaxially positioned make-injection assembly 10 as shown more clearly on FIGS. 2, 3 and 4 of the drawing.

The outer end of the burner block is enclosed by a wind box 11 to which an oxygen-containing gas, for instance air, is introduced under moderate pressure through inlet conduit 12.

The wind box is in open communication with the upstream end of the furnace chamber through the burner ports symmetrically positioned over the face of the burner block, and each burner port is provided with a fuel injection assembly 13, positioned coaxially with the burner port and extending outwardly through the end wall of the wind box. Each of these assemblies comprises an atomizing nozzle 14 connected by means of tube 15 with a mixing chamber 16 to which the fuel oil is supplied through inlet 17 and the atomizing gas supplied through conduit 18, the ratio of air to gas being controlled by valve 19. Fuel injection assemblies of this type are well-known and are readily available. It will be understood that in place thereof other assemblies adapted to the gas-atomization of fuel oils may be used.

In order to provide smooth operation of the furnace, it is frequently necessary to adjust the exit spray nozzles of the assemblies with respect to the inner face of the burner block, as described, for instance, in my Patent 2,529,873, and, for this purpose, the outer wall of the wind box is provided with sealing members 20 through which the tubes 15 pass and can be readily moved inwardly or outwardly, and are held in the adjusted position by set screws 21. Advantageously, tubes 15 are centered in the burner ports and supported therein by spiders or slip-collar guides of well-known construction which permit the passage of air through the ports, not necessary to show in the drawing.

The construction of the make injection assembly 10 is shown more clearly on the enlarged FIGS. 2 and 4. This assembly comprises a cylindrical casing 22 extending coaxially through the burner block and projecting outwardly beyond the rear wall of the wind box. In the drawings, this make injection assembly is shown with its inner end flush with the inner face of the burner block, but is adapted to be moved inwardly, when desired, so as to project a greater or less distance into the furnace chamber beyond the inner face of the burner block. For this purpose, a sliding contact is provided between tube 22 and the central opening through the burner block, and a seal 23, equipped with set screw 24, is provided at the point where tube 22 extends through the rear wall of the wind box.

As previously noted, the make injection assembly may comprise a single coaxially positioned spray nozzle. However, a particularly advantageous arrangement of the make injection assembly is shown in detail in FIG. 2 of the drawing comprising a cluster of six spray nozzles symmetrically positioned about the longitudinal axis of the furnace chamber. As noted above, this assembly comprises an outer cylindrical housing 22 closed at its inner end by wall 25 into which spray nozzles 26 are sealed. In order to protect the incoming make from overheating, an annular water jacket 27 is provided extending longitudinally along the inner face of wall 22, between that wall and an inner cylindrical wall 22a, through which water or other cooling medium is circulated, as hereinafter described.

The spray nozzles 26 are provided internally with members 28 threaded at 29 into tubes 30 and provided with central passageways 31 coaxially positioned with respect to the nozzle discharge ports 32. The outer peripheries of members 28 are provided with helical vanes adapted to impart a whirling motion to the oil passing through the annular passageway between member 28 and the inner surface of nozzle 26.

The respective nozzles 26 are threaded onto nipples 33 which are in turn threaded through the partition member 34 and open into oil manifold chamber 35.

Just at the left of the oil chamber 35 is a gas manifold chamber 36 separated therefrom by partition member 37, through which the tubes 30 project. Oil is supplied under pressure to chamber 35 through tube 38 extending concentrically through tube 39 by which the atomizing gas is supplied to the gas manifold chamber 36 and which is threaded into partition 40 forming the outer wall of said chamber.

For preventing overheating of the unit, water or other cooling medium is charged to the assembly, through flexible conduits 41, to the respective cooling medium inlet tubes 42 positioned on either side of conduit 39, and is conveyed by conduits 42 through the assembly and discharged at 43 adjacent the inner face of the assembly. From thence, the cooling medium passes in heat exchange relation with inner wall 25 and the upstream ends of nozzles 26 and flows outwardly through the annular jacket 27 to exit tube 45 and outwardly through flexible connection 46.

In operation of this make-injection assembly, the incoming make is passed under moderate pressure through tube 38 into oil manifold chamber 35 and thence through annular passageways 47, wherein it is given a rapid whirling motion before passing into the downstream chambers of the respective nozzles. The atomizing gas under considerable pressure, as previously described herein, is charged into the gas manifold chamber 36 through conduit 39 and passes therefrom through the respective tubes 30 and passageways 31 into said downstream mixing chambers of the nozzle, wherein it passes at high velocity in contact with the oil, resulting in the atomizing of the oil and projecting of the atomized oil stream into the furnace chamber through exit ports 32.

The fuel oil charged to the mixing chambers 16 through conduits 17 is thoroughly mixed with the atomizing gas, e.g. air, entering through lines 18 and the mixture is passed through tubes 13 to spray nozzles 14 whereby the gas-atomized spray of the liquid fuel oil is forcefully injected into the furnace chamber, surrounded by an annular stream of air flowing from the wind box through the respective ports, resulting in the rapid combustion of the fuel oil by combining with the oxygen of the air under the high temperature conditions prevailing within the furnace chamber.

The rapidity of the combustion will depend somewhat upon the extent of atomization of the oil, the character of the oil, furnace temperature and the like, as well as the extent of preheating of the oil and atomizing gas. The relative proportion of air to fuel oil will likewise influence the rate and completeness of combustion. It is generally desirable that the ratio of total air, i.e. air passed through the ports from the wind box plus that used to atomize the fuel oil, be somewhat in excess of that theoretically required for complete combustion of the fuel oil. The optimum amount of air will vary with the nature of fuel oil used.

As previously noted, it is highly desirable that the combustion of the fuel oil be substantially complete before the atomized make is dispersed in the resultant blast flame gases. For accomplishing this purpose, it is sometimes desirable to move the make injection assembly inwardly so that its inner face is somewhat downstream from the inner face of the burner block, thus permitting increased time for completion of combustion of the fuel oil. However, this may be unnecessary, especially where other operating conditions are adjustable to effect rapid combustion of the fuel oil.

Even where the make injection assembly is positioned as shown in FIG. 1, with respect to the inner face of the burner block, there is an appreciable interval of time between the injection of the fuel oil into the furnace chamber and the intimate mixing of the make with the resultant blast flame gases. Though this time interval is exceedingly small, probably measurable in microseconds, it should be kept in mind that under the conditions described combustion of the fuel oil is also exceedingly rapid. This time interval preceding the intermixing of the atomized make with the resultant blast flame gases appears to be materially extended, in accordance with my present process, by reason of the coaxial injection of the make, thus permitting more complete combustion and adequate dispersion of the liquid make before destructive decomposition thereof to coke or carbon black.

This time interval may also be varied somewhat by variation in the angle of spread of the make injection nozzles. Optimum results are obtained by the selection and use of spray nozzles having a minimum angle of spread, commensurate with thorough atomization. Nozzles of the type described having a spread angle not exceeding 15° have been found most advantageous for use in accordance with the present invention.

The invention will be further described and illustrated by the following specific examples of the process as carried on in apparatus such as represented by the drawings, comprising a furnace chamber of circular cross-section. It will be understood, however, that the invention also contemplates installations in which the cross-section of the furnace chamber is of rectangular or other shape.

In the following illustrative operations, the reaction chamber proper is approximately 20 feet in length and 2 feet inside diameter. The burner block is provided with 18 burner ports approximately 2 inches, I.D., flaring outwardly to a diameter of 3½ inches and positioned as shown in FIG. 3 of the drawings, each provided with a fuel injection assembly substantially as shown. The make injection assembly is provided with 6 nozzles positioned and arranged substantially as shown in FIGS. 1, 2 and 4 of the drawings.

*Example I*

Using as the fuel for generating the hot blast stream, an oil of the nature of commercial "No. 6 fuel oil" having the following characteristics:

| | |
|---|---|
| Viscosity, SSU at 210° F | 159 |
| Index of refraction | 1.571 |
| API gravity | 13.2 |
| Percent Ramsbottom carbon residue | 8.06 | and, as the make, a hydrocarbon residue of moderate aromaticity and having the following characteristics:

| | |
|---|---|
| Viscosity, SSU at 210° F | 35 |
| Index of refraction | 1.535 |
| API gravity | 19.1 |
| Percent Ramsbottom carbon residue | 2.32 |
| Molecular weight | 255 | air is charged into the wind box at a rate of 120,000 cubic feet per hour under a moderate pressure of about 2–5 pounds per square inch; the fuel oil preheated to a temperature of about 500°–600° F. is charged at the total rate of 60 gallons per hour, gas-atomized by means of air under a pressure of 30 pounds per square inch. The make, preheated to a temperature of 450°–500° F., is charged through the 6 injection nozzles at a total rate of 140 gallons per hour and atomized by means of superheated steam at a pressure of approximately 100 pounds per square inch, the make spray nozzles being positioned about 5 inches downstream from the inner face of the burner block. The furnace temperatures near the upstream end of the chamber range from about 2600° to 2700° F. A total yield of carbon black of 3.13 pounds per gallon of make oil is produced at a rate approximating 10,500 pounds per day, having an ABC color rating of 90, a tinting strength 72% that of standard commercial FF (fine furnace) carbon black and an oil absorption value of 14.5 gallons per 100 pounds of the black.

*Example II*

In an operation substantially as described in Example I, but using a highly aromatic petroleum residue having the following characteristics:

| | |
|---|---|
| Viscosity, SSU at 210° F | 47 |
| Index of refraction | 1.645 |
| API gravity | 1.8 |
| Percent Ramsbottom carbon residue | 8.98 |
| Molecular weight | 264 | a total yield of 5.40 pounds of carbon black per gallon of make is obtained at the rate of about 18,100 pounds per day having an ABC color rating of 90, a tinting strength equal to 72% that of standard FF carbon black and an oil absorption value of 16.7 gallons per 100 pounds of the black.

In the foregoing specific examples, the amounts of the several oils are expressed in terms of volume calculated at 60° F., and combustion of the fuel oil is substantially completed, e.g. to the extent of at least 90%, prior to the dispersion of the atomized make therein.

It will be understood that these specific examples are for purposes of illustration and are not to be considered as limitative. The process and apparatus are adaptable to wide variations in operating conditions, not only with respect to the character of the liquid fuel and liquid make, as previously described, but also with respect to furnace load, charging ratios and the like. An outstanding advantage is the extreme flexibility of the process and apparatus whereby various characteristics may be embodied in the resulting carbon black as required.

Though substantial preheating of the charging oils is highly advantageous, the extent of such preheating is subject to considerable variation, care being taken to avoid preheating of either the fuel oil or the make to a temperature at which coke deposits in the injection systems would result. The fuel oil, for instance, may with advantage be preheated to temperatures ranging from 250° F. to 600° F., depending upon the type of oil used. Similarly, the make may be charged at normal temperature or preheated to temperatures ranging from normal to as high as 500° F., or even higher, likewise depending upon the character of the oil.

It will also be understood that the designation "hydrocarbon" used in the appended claims is intended to include materials consisting principally of chemically combined carbon and hydrogen and resembling hydrocarbons, such as various petroleum and coal tar distillates and residues, even though the molecular composition of some of the contained materials may include elements other than carbon and hydrogen, for instance creosote or the like.

I claim:

1. In the process for producing carbon black by the decomposition of a fluid hydrocarbon whereby the hydrocarbon to be decomposed is separately and forcefully injected into, and mixed with, a turbulent stream of hot blast flame gases passing longitudinally through an elongated, heat-insulated, unobstructed reaction chamber of substantially uniform transverse dimension and is decomposed by heat absorbed from the hot gases to form carbon black in suspension, the suspension being withdrawn from the downstream end of the chamber and the carbon black separated therefrom, the steps of generating, within the furnace chamber a uniform, turbulent stream of blast flame gases by forcefully injecting longitudinally into the upstream end of the chamber a multiplicity of substantially parallel gas-atomized streams of a liquid fuel symmetrically and uniformly positioned over substantially the entire transverse area of the chamber and each surrounded by an entering sheath of a free oxygen-containing gas, thereby forming a combustible mixture, and burning said mixture substantially completely as it enters the chamber, and separately and forcefully injecting a liquid hydrocarbon to be decomposed to carbon black, substantially longitudinally of the furnace chamber, into the resulting hot gas stream as at least one gas-atomized liquid spray substantially centrally positioned with respect to, and surrounded by, the entering streams of the liquid fuel and air and thereby rapidly mixing the hydrocarbon to be decomposed with the hot stream of blast flame gases.

2. The process of claim 1 in which the hydrocarbon to be decomposed to carbon black is injected as a plurality of gas-atomized liquid sprays symmetrically positioned about the longitudinal axis of the chamber.

3. The process of claim 1 in which the automizing gas is under a pressure of 30 pounds to 100 pounds per square inch.

4. The process of claim 1 in which the fuel-atomizing gas is air and the fuel oil is preheated to a temperature within the range of 250° to 600° F.

5. The process of claim 2 in which the liquid hydrocarbon to be decomposed to carbon black is atomized by superheated steam at a pressure within the range of 30 pounds to 100 pounds per square inch.

6. The process of claim 5 in which the hydrocarbon to be decomposed is a viscous petroleum residue.

7. The process of claim 6 in which the hydrocarbon to be decomposed is preheated to a temperature not exceeding about 500° F.

8. Apparatus for producing carbon black by thermal decomposition of a liquid hydrocarbon, comprising an elongated, unobstructed reaction chamber delineated by heat-insulated side walls of furnace refractory and opening at its downstream end into a cooling zone, the upstream end of said chamber being closed by a burner block, means extending through the burner block longitudinally into the furnace chamber, and positioned coaxially with respect to said chamber, for forcefully injecting substantially longitudinally into the chamber at least one stream of gas-atomized liquid spray of the hydrocarbon to be decomposed to carbon black, a multiplicity of burner ports extending through the burner block and uniformly positioned over substantially the entire transverse area of the chamber and symmetrically positioned with respect to the longitudinally axis of the chamber, means for forcefully injecting into the furnace chamber through the said ports gas-atomized streams of a liquid fuel and means for passing to the chamber through said ports streams of an oxygen-containing gas for supporting combustion of the fuel spray, the said means for injecting the hydrocarbon to be decomposed to carbon black comprising two coaxially positioned elongated tubes, spaced apart to form an annular cooling jacket and an inner chamber, the outer tube being closed at its ends by front and rear walls and extending beyond the inner tube at the front end, a first transverse partition across the front end of the inner tube, thereby forming an end chamber in open communication with the said annular cooling jacket, a second transverse partition wall across the inner tube spaced from said first partition to form a first manifold chamber, a third transverse partition wall across the inner tube spaced from said second partition to form a second manifold chamber, a plurality of atomizing nozzles positioned in said end chamber and extending through the adjacent end wall of the outer tube and each comprising a liquid chamber and a gas chamber within the nozzle, connecting conduits leading to each of the gas chambers from one of said manifolds, connecting conduits leading to each of the liquid chambers from the other manifold, coaxially positioned conduits leading through the rear end wall of the outer tube to the respective manifold chambers, conduit means for introducing a cooling medium into the said end chamber adjacent the front end wall thereof and a cooling medium exit conduit adjacent the opposite end of the annular cooling jacket.

9. Apparatus for producing carbon black by thermal decomposition of a liquid hydrocarbon comprising an elongated, generally horizontally-extending, unobstructed reaction chamber of substantially uniform transverse dimension throughout its length, and having a rectilinear axis throughout its length delineated by heat-insulated side walls of furnace refractory, a vertically-extending cooling chamber, said reaction chamber opening at its downstream end, to its full dimension, directly into said cooling chamber, a burner block positioned in the upstream end of said reaction chamber and closing said end of the reaction chamber, injection means extending throughout the burner block longitudinally of said rectilinear axis and positioned coaxially with respect to said reaction chamber, said injection means being adapted to forcefully inject substantially longitudinally into said reaction chamber at least one stream of gas-atomized liquid spray of the hydrocarbon to be decomposed to carbon black, a multiplicity of burner ports extending through the burner block in a direction parallel to said rectilinear axis and uniformly positioned over substantially the entire transverse area of the reaction chamber and positioned symmetrically with respect to the longitudinal axis of the reaction chamber, injection means adapted to forcefully inject into the reaction chamber through the respective burner ports gas-atomized streams of a liquid fuel and means for passing to the reaction chamber through said burner ports an oxygen-containing gas for supporting combustion of the liquid fuel.

10. The apparatus of claim 9 in which the means for injecting into the reaction chamber the hydrocarbon to be decomposed comprises a cluster of spray nozzles symmetrically positioned about the longitudinal axis of the chamber.

11. The apparatus of claim 9 in which the means for injecting the hydrocarbon to be decomposed into the reaction chamber is mounted for movement longitudinally with respect to the burner block, and an annular jacket is positioned about the injection means for the liquid fuel through which a cooling medium is adapted to flow to thermally shield said injection means.

References Cited in the file of this patent

UNITED STATES PATENTS

| | | |
|---|---|---|
| 2,553,199 | Loving | May 15, 1951 |
| 2,625,466 | Williams | Jan. 13, 1953 |
| 2,659,662 | Heller | Nov. 17, 1953 |
| 2,769,692 | Heller | Nov. 6, 1956 |
| 2,781,247 | Krejci | Feb. 12, 1957 |
| 2,813,009 | Ekholm et al. | Nov. 12, 1957 |